(12) United States Patent
Martini

(10) Patent No.: US 11,722,509 B2
(45) Date of Patent: Aug. 8, 2023

(54) MALWARE DETECTION FOR PROXY SERVER NETWORKS

(71) Applicant: iboss, Inc., Boston, MA (US)

(72) Inventor: Paul Michael Martini, Boston, MA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 17/945,892

(22) Filed: Sep. 15, 2022

(65) Prior Publication Data

US 2023/0020721 A1    Jan. 19, 2023

Related U.S. Application Data

(63) Continuation of application No. 17/828,678, filed on May 31, 2022, now Pat. No. 11,489,858, which is a
(Continued)

(51) Int. Cl.
*H04L 9/40* (2022.01)
*G06F 21/56* (2013.01)
(Continued)

(52) U.S. Cl.
CPC ........ *H04L 63/1425* (2013.01); *G06F 21/567* (2013.01); *H04L 61/4511* (2022.05);
(Continued)

(58) Field of Classification Search
CPC . H04L 63/1425; H04L 67/2809; H04L 67/02; H04L 61/6013; H04L 63/1441;
(Continued)

(56) References Cited

U.S. PATENT DOCUMENTS 9,003,526 B2 * 4/2015 El-Moussa .......... H04L 63/1425
726/23
9,705,922 B2 * 7/2017 Foxhoven ........... G06F 12/0815
(Continued)

OTHER PUBLICATIONS

Luo et al., "Leveraging client-side DNS failure patterns to identify malicious behaviors," 2015 IEEE Conference on Communications and Network Security (CNS) Year: 2015 | Conference Paper | Publisher: IEEE.*
(Continued)

*Primary Examiner* — Roderick Tolentino
(74) *Attorney, Agent, or Firm* — Fish & Richardson P.C.

(57) ABSTRACT

This specification generally relates to methods and systems for applying network policies to devices based on their current access network. One example method includes identifying a proxy connection request sent from a particular client device to a proxy server over a network, the proxy connection request including a hostname and configured to direct the proxy server to establish communication with the computer identified by the hostname on behalf of the client device; determining an identity of the client device based on the proxy connection request; identifying a domain name system (DNS) response to a DNS request including the hostname from the proxy connection request; and updating DNS usage information for the particular client based on the identified DNS response including the hostname from the proxy connection request.

20 Claims, 4 Drawing Sheets

Related U.S. Application Data continuation of application No. 15/256,418, filed on Sep. 2, 2016, now abandoned.

(51) Int. Cl.

| | |
|---|---|
| *H04L 61/4511* | (2022.01) |
| *H04L 61/59* | (2022.01) |
| *H04L 67/562* | (2022.01) |
| *H04L 67/02* | (2022.01) |
| *H04L 101/35* | (2022.01) |

(52) U.S. Cl.
CPC .......... *H04L 61/59* (2022.05); *H04L 63/0281* (2013.01); *H04L 63/1416* (2013.01); *H04L 63/1441* (2013.01); *H04L 63/164* (2013.01); *H04L 63/168* (2013.01); *H04L 67/02* (2013.01); *H04L 67/562* (2022.05); *H04L 2101/35* (2022.05); *H04L 2463/144* (2013.01)

(58) Field of Classification Search
CPC ............. H04L 63/1416; H04L 63/1408; H04L 47/822; G06F 21/316
See application file for complete search history.

(56) References Cited

U.S. PATENT DOCUMENTS

| | | | | |
|---|---|---|---|---|
| 2007/0039053 | A1* | 2/2007 | Dvir | G06F 21/52 713/188 |
| 2008/0082662 | A1 | 4/2008 | Dandliker | |
| 2010/0118869 | A1* | 5/2010 | Li | H04L 69/167 370/389 |
| 2011/0302656 | A1* | 12/2011 | El-Moussa | H04L 63/1416 726/24 |
| 2012/0303808 | A1 | 11/2012 | Xie | |
| 2014/0283062 | A1* | 9/2014 | Kamthe | H04L 63/1425 726/23 |
| 2016/0021056 | A1* | 1/2016 | Chesla | G06F 21/56 726/11 |
| 2016/0050224 | A1* | 2/2016 | Ricafort | H04L 63/1416 726/23 |
| 2016/0277435 | A1* | 9/2016 | Salajegheh | H04W 12/12 |
| 2016/0323409 | A1* | 11/2016 | Kölhi | H04L 67/5681 |
| 2016/0344606 | A1* | 11/2016 | Baccarani | H04L 41/5067 |
| 2017/0374017 | A1* | 12/2017 | Gautam | H04L 67/568 |
| 2018/0069878 | A1 | 3/2018 | Martini | |

OTHER PUBLICATIONS

Cai et al., "A Behavior-Based Method for Detecting DNS Amplification Attacks," 2016 10th International Conference on Innovative Mobile and Internet Services in Ubiquitous Computing (IMIS) Year: 2016 | Conference Paper | Publisher: IEEE.*

Al-Batanieh et al., "Analysis and detection of malicious data exfiltration in web traffic," 2012 7th International Conference on Malicious and Unwanted Software Year: 2012 | Conference Paper | Publisher: IEEE.*

Apple.com Blog "DNS Server Logs to Monitor Traffic", Mar. 29, 2016, downloaded from the internet at: http://discussions.apple.com/thread/7513584?start=0&tstart=0 on Sep. 1, 2016, 5 pages.

Bro.org, "Monitoring HTTP Traffic with Bro", Sep. 1, 2016, downloaded from the internet at: https://www.bro.org/sphinx-git/httpmonitor/index.html on Sep. 1, 2016, 10 pages.

Cai et al., "A Behavior-Based Method for Detecting DNS Amplification Attacks," 2016 10th International Conference on Innovative Mobile and Internet Services in Ubiquitous Computing (IMIS) Year: 2016 1 Conference Paper 1 Publisher: IEEE.

Extended European Search Report in European Appln No. 17847650, dated May 31, 2019, 6 pages.

International Preliminary Report on Patentability in International Appln. No. PCT/US2017/49949, dated Mar. 5, 2019, 6 pages.

International Search Report and Written Opinion in International Appln. No. PCT/US2017/49949, dated Sep. 27, 2017, 11 pages.

Luo et al., "Leveraging client-side DNS failure patterns to identify malicious behaviors," 2015 IEEE Conference on Communications and Network Security (CNS) Year: 2015 1 Conference Paper 1 Publisher: IEEE.

Newton, "Domain Name System—How DNS Lookups Work When Using an HTTP Proxy (or not) in IE", Aug. 8, 2011, downloaded from the internet at: http://serverfault.com/questions/169816/how-dns-lookups-work-when-using-an-http-proxy-or-not-in-ie on Sep. 1, 2016, 4 pages.

Zhirayr, "How to Monitor Squid Proxy Server", Aug. 10, 2012, downloaded from the internet at: http://www.monitis.com/blog/how-to-monitor-squid-proxy-server/ on Sep. 1, 2016, 12 pages.

* cited by examiner

MALWARE DETECTION FOR PROXY SERVER NETWORKS

CLAIM OF PRIORITY

This application is a continuation application of and claims priority to U.S. application Ser. No. 17/828,678 filed on May 31, 2022, which is a continuation application of and claims priority to U.S. application Ser. No. 15/256,418 filed on Sep. 2, 2016 (Abandoned), the entire contents of which are hereby incorporated by reference.

BACKGROUND

This specification generally relates to methods and systems for detecting malware in proxy server networks.

In corporate and other networks, computers may communicate with hosts on external networks, such as the Internet, which may render the computer and other computing resources vulnerable to malicious activity and attackers, such as botnets and spyware. In some cases, the computers may communicate through a proxy server that communicates with external network hosts on behalf of the computers.

SUMMARY

In general, one aspect of the subject matter described in this specification may be embodied in systems, and methods performed by data processing apparatuses that include the actions of receiving a message from a device over a network, the message associated with a source address; determining a current access network for the device based at least in part on the source address; and applying a network policy to the device based on the determined current access network.

In general, one aspect of the subject matter described in this specification may be embodied in systems, and methods performed by data processing apparatuses that include the actions of identifying a proxy connection request sent from a particular client device to a proxy server over a network, the proxy connection request including a hostname and configured to direct the proxy server to establish communication with the computer identified by the hostname on behalf of the client device; determining an identity of the client device based on the proxy connection request; identifying a domain name system (DNS) response to a DNS request including the hostname from the proxy connection request; and updating DNS usage information for the particular client based on the identified DNS response, including the hostname from the proxy connection request.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
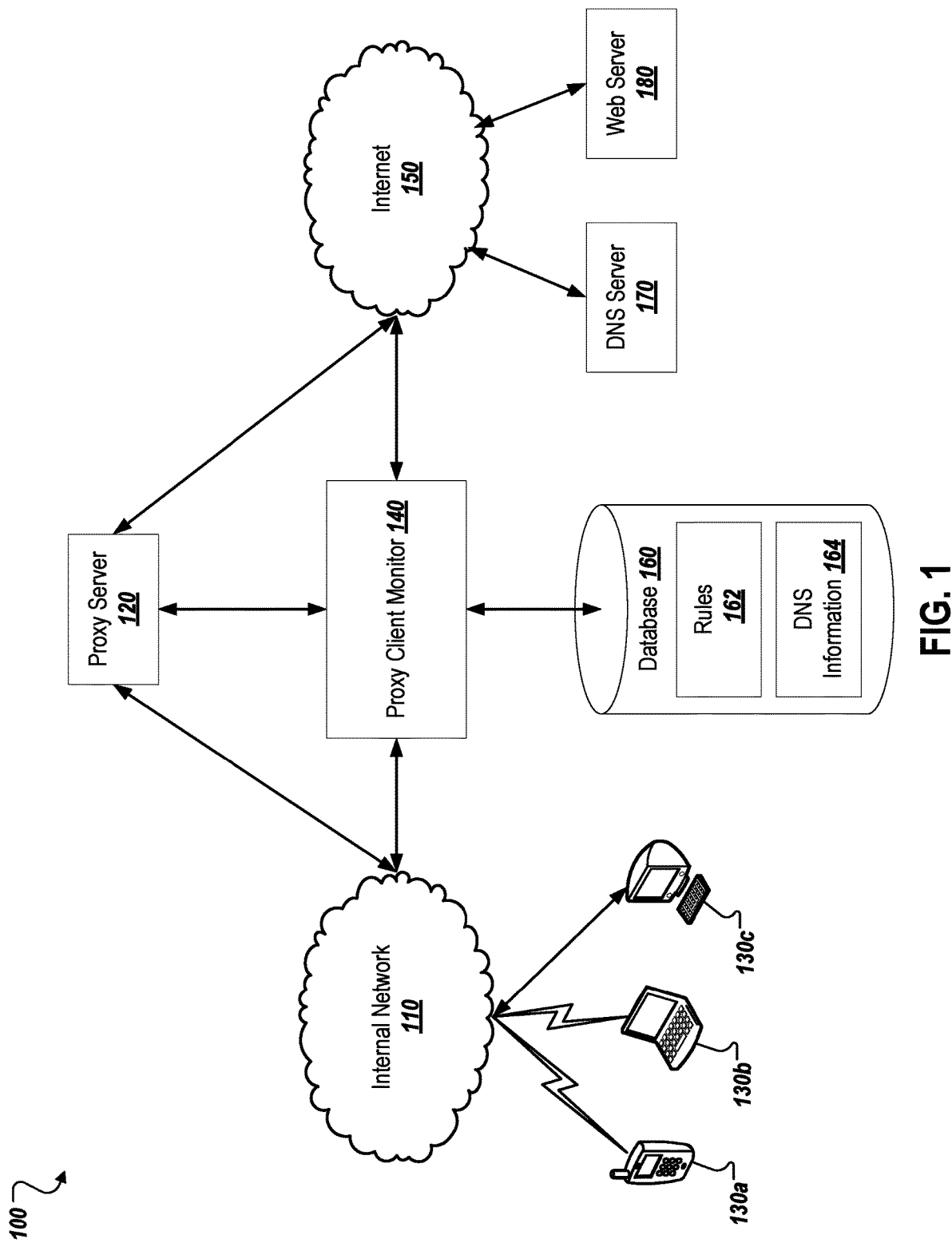
FIG. 1 is a diagram of an example environment for implementing network security based on DNS usage information.

In some existing networking environments, a proxy server can be used as an intermediate communication point between network-enabled devices on a network and remote resources on public networks (e.g., the Internet). For example, a computer on a local network can initially communicate with a proxy server, which is further connected to the Internet. The proxy server can act as an intermediary to communicate a user-initiated request, for instance, between the computer on the local network and a host that is accessible via the Internet, for example, to retrieve Internet-based content such as a webpage. Cyber-security mechanisms can also be used within a network to protect computing resources that may communicate with unknown, untrusted, or malicious sources on the Internet. Such resources can be comprised of malicious software (e.g., viruses or malware) as a result of these communications. In some instances, security mechanisms can control, identify, and mitigate attacks prior to entering the network. However, after a client computer has been infected, it may be further exploited to spread malicious software to other networks and resources. Therefore, it may be desirable to identify a client computer exhibiting anomalous behavior, such as requesting invalid domains, in order to curb potential security threats on the network (e.g., malware infections). However, a proxy server communicating on behalf of multiple clients can create ambiguity in determining the exact originating computer associated with the suspicious operations.

Accordingly, the present specification describes techniques for detecting anomalous network behavior by a client device (e.g., a computing resource on a local network) in a proxy server configuration by associating Domain Name System (DNS) messages sent by the proxy server with the client device that triggered the DNS messages. One example method includes identifying a proxy connect request sent from a particular client device to a proxy server over a network, the proxy connect request including a hostname, and configured to direct the proxy server to establish communication with the computer identified by the hostname on behalf of the client device. An identity of the client device is determined based on the proxy connection request. Thereafter, a DNS response is sent to a DNS request including the hostname from the proxy connect request. DNS usage information is generated for the particular client device based on the identified DNS response including the hostname from the proxy connect request. In some cases, it is determined whether the particular client device is exhibiting anomalous behavior based on the updated DNS information.

Implementations according to the present disclosure have several potential advantages. By passively monitoring proxy connection requests from clients accessing a proxy server, and performing independent DNS queries based on the hostnames in those requests, the present techniques may enable an assessment of DNS traffic generated by proxy clients without necessitating changes to the configuration or operation of existing proxy servers. The present techniques may also allow anomalous network behavior to be detected and correlated to a particular client device in a network utilizing proxy servers. For example, the present techniques may enable a determination that a particular client device on a network is a potential security threat (e.g., infected by malware), even if the client device is communicating through a proxy server, by inspecting DNS queries and responses generated by the proxy server. The disclosed techniques may be more reliable than some previous malware detection techniques using static identifiers, such as domain names, associated with known malicious sources (e.g., blacklist). As an example, blacklisting detection mechanisms can be circumvented by malware exploiting software capable of the generating and registering a large number of domain names. Further, the present techniques support malware detection in network environment using encrypted Hypertext Transfer Protocol (HTTP) or Hypertext Transfer Protocol Secure (HTTPS) without the need for decryption, and thereby increase system efficiency.

FIG. 1 is a diagram of an example environment for implementing anti-malware security based on DNS usage information in a network architecture where the traceability to DNS requests from a potentially infected local client may be limited (i.e., using proxy servers to allow for computers on a local network to access a public network) to some existing network security devices. As shown, the environment 100 includes an internal network 110 connected to Internet 150. The Internet 150 is a public network connecting multiple disparate resources (e.g., servers, networks, etc.). In some cases, Internet 150 may be any public or private network external to the internal network 110 or operated by a different entity than internal network 110. Data may be transferred over the Internet 150 between computers and networks connected thereto using various networking technologies, such as, for example, ETHERNET, Synchronous Optical Networking (SONET), Asynchronous Transfer Mode (ATM), Code Division Multiple Access (CDMA), Long Term Evolution (LTE), Internet Protocol (IP), Hypertext Transfer Protocol (HTTP), HTTP Secure (HTTPS), Domain Name System (DNS) protocol, Transmission Control Protocol (TCP), Universal Datagram Protocol (UDP), or other technologies.

As an example, the internal network 110 is a local area network (LAN) for connecting a plurality of client devices with differing capabilities, such as handheld computing devices, illustrated as cellular phone 130*a* and laptop computer 130*b*, and traditional computer devices, illustrated as desktop computer 130*c*. The network 110 may be a wired or wireless network utilizing one or more network technologies, including, but not limited to, ETHERNET, WI-FI, CDMA, LTE, IP, HTTP, HTTPS, DNS, TCP, UDP, or other technologies.

A web server 180 and a DNS server 170 are connected to the Internet 150. Client devices 130 may communicate with the web server 180, the DNS server 170, and other servers via the Internet 150 using the proxy server 120. For example, the client devices 130 may request content hosted on web server 180 using networking technologies (e.g., WI-FI) and appropriate protocols (e.g., TCP/IP, HTTP). The internal network 110 is used by connected client devices 130 to access the Internet 150 via the proxy server 120. As shown in FIG. 1, the proxy server 120 is connected to both the internal network 110 and the Internet 150. Additionally, the environment 100 includes an anti-malware system 140 that is connected to a database 160.

The client computer 130 can request content available on the Internet, such as a website hosted by web server 180. In some cases, requesting such content includes the client computer 130 sending an HTTP GET request to a particular web server 180 that hosts the requested content. For example, a web server 180 can host a static website, which includes individual web pages having static content. The web server 180 can also contain client-side scripts for a dynamic website that relies on server-side processing, for example server-side scripts such as PHP, Java Server Pages (JSP), or ASP.NET. The HTTP request may include a Uniform Resource Locator (URL) identifying the requested content. The web server 180 may be associated with a domain name, such as "example.com." The web server 180 may also be associated with a hostname or sub-domain (e.g., "webserver"), thereby allowing it to be accessed using an address such as "webserver.example.com."

As described above, a proxy server (e.g., 120) acts as an intermediary between clients (e.g., 130*a*-130*c*) and servers on the Internet 150 (e.g., web server 180). As illustrated in FIG. 1, the proxy server 120 is located between the clients 130*a*-130*c* on the internal network 110 and the Internet 150. In the example environment illustrated in FIG. 1, instead of sending requests directly to the web server 180 the clients 130*a*-130*c* send requests to the proxy server 120. The proxy server 120 then opens a connection to the web server 180 on behalf of the requesting client 130*a*-130*c*, and passes on the clients' request. The proxy server 120 receives a reply from the web server 180, and then forwards that reply back to the appropriate client device 130.

In this example operation, the proxy server 120 acts as a client (i.e., to web server 180) and a server (e.g., to the initial clients 130*a*-*c*). In some cases, a client 130*a*-*c* may send a proxy connection request to the proxy server 120 to instruct the proxy server 120 to establish a connection with the web server 180 on behalf of the particular client. The proxy server 120 may use information from a URL included in the proxy connection request to establish a connection, such as a requested hostname, a requested port, and a requested path. For example, the proxy server 120 may receive a proxy connection request (e.g., an HTTP CONNECT message) from client 130*a* including the URL "webserver.example.com." In order to establish the connection, the proxy server 120 may query the DNS server 170 to obtain an address for the requested hostname. Once the proxy server 120 obtains the address, it may establish a connection to the web server 180. The proxy server 120 may then forward requests (e.g., HTTP GET messages) received from the client 130*a* to the web server 180 using the established connection, and forward responses received from the web server 180 (e.g., the content requested by the HTTP GET messages) to the client 130*a*. This process is generally referred to as "HTTP Tunneling." In some cases, the communication between the client 130*a* and the web server 180 may be encrypted, for example, by using the HTTPS protocol. In such a case, the proxy server 120 may forward the encrypted data to the web server 180. The proxy server 120 may serve merely as a pass-through in such a configuration, and may not decrypt the information in passing it on to the web server 180.

As mentioned above, the proxy server 120 resolves the hostname in the proxy connection request to a network address (e.g., an IP address) in order to establish the requested connection. DNS server 170 performs this resolution by mapping address mappings to Fully Qualified Domain Name (FQDNs). DNS server 170 may function as a part of the DNS architecture of the Internet 150, which includes a distributed set of servers that store FQDN-to-IP-address mappings to make host name resolution scalable and centrally manageable. As an example, each of a plurality of DNS servers stores records for a specific portion of the namespace. DNS server 170 can be authoritative for a portion of the namespace that corresponds to records stored on that server. In some implementations, DNS server 170 can be configured with pointer records to other DNS servers accessible via the Internet 150, for example, to facilitate the resolution of valid domain names for other portions of the Internet namespace.

As shown, environment 100 includes an anti-malware system 140 configured to monitor proxy connection requests from the client 130*a-c* to the proxy server 120. In this way, anomalous activity originating from the proxy server 120, such as repeated requests for invalid domain names, may be traced to the particular client that requested the activity.

In some implementations, the anti-malware system 140 may perform a DNS query for each domain name identified in a proxy connection request, for example, by querying the DNS server 170. For example, the anti-malware system 140 may identify that client 130*a* sent a proxy connection request to the proxy server 120 including the hostname "bad.virus.com." The anti-malware system 140 may then send a DNS to DNS server 170 for the hostname "bad.virus.com." The anti-malware system 140 may receive a DNS response from the DNS server 170. In some cases, the DNS response may include one or more addresses corresponding to the hostname from the DNS request, and/or a status code indicating whether the request succeeded. For example, if no addresses are associated with "bad.virus.com," the DNS server 170 may return a status code indicating that it failed to resolve the DNS request. The anti-malware system 140 may associate client 130*a* with information from the DNS request and response, and may store this association in the database 160 as DNS information 164. For example, the DNS information 164 may include the IP address of the client, a timestamp of the proxy connection request, and some or all of the information from the DNS request and response.

In some cases, the anti-malware system 140 may monitor and associate DNS activity originating from the proxy server 120 with a particular client by monitoring proxy connection requests sent by the clients 130*a-c* to the proxy server 120. For example, the anti-malware system 140 may identify that client 130*a* sent a proxy connection request to the proxy server 120 including the hostname "bad.virus.com." The anti-malware system 140 may then identify a DNS request sent by the proxy server 120 to DNS server 170 for the hostname "bad.virus.com." The anti-malware system 140 may determine that this DNS corresponds to the previous proxy connection request from client 130*a*. In some cases, the anti-malware system 140 may make this determination based on the proximity in time of the proxy connection request and the DNS request, such as by observing that the DNS request for the hostname "bad.virus.com" was the next DNS request for that hostname sent by the proxy server 120 after it received the proxy connection request for that hostname from client 130*a*. In some cases, the anti-malware system 140 may also identify the DNS response corresponding to the proxy connection request from client 130*a*. In some cases, the DNS response may include one or more addresses corresponding to the hostname from the DNS request, and/or a status code indicating whether the request succeeded. For example, if no addresses are associated with "bad.virus.com," the DNS server 170 may return a status code indicating that it failed to resolve the DNS request. The anti-malware system 140 may associate client 130*a* with information from the DNS request and response, and may store this association in the database 160 as DNS information 164. For example, the DNS information 164 may include the IP address of the client, a timestamp of the proxy connection request, and some or all of the information from the DNS request and response.

In some implementations, the anti-malware system 140 may perform independent DNS queries based on the identified proxy connection requests. In such a case, the anti-malware system 140 may send a DNS request for each hostname identified in a proxy connection request (e.g., "bad.virus.com") and may store the information from the DNS response monitoring DNS requests sent by the proxy server 120 on behalf of the clients 130*a-c*, and DNS responses from the DNS server 170 to the proxy server 120. In some cases, the proxy server 120 may be configured to send all DNS requests to the anti-malware system 140. In such a case, the anti-malware system 140 may send the requests to DNS server 170, and forward responses to the proxy server 120. In this configuration, the anti-malware system 140 effectively functions as a DNS server for the proxy server 120, and thus may analyze DNS requests and responses for the proxy server 120 in an unobtrusive manner. In some cases, the anti-malware system 140 can be implemented as an integrated element of the proxy server 120. For example, the capabilities of the anti-malware system 140 can be programmed as a software agent executing on the proxy server 120. According to this implementation, the anti-malware system 140 may monitor traffic transmitted to and/or from the proxy server 120 without having to monitor the traffic in transit over either the internal network 110 or the Internet 150.

The anti-malware system 140 may monitor network traffic on the internal network 110 and/or the Internet 150 using various technologies, such as packet scanning (or packet sniffing), port monitoring, and traffic flow monitoring. In some cases, anti-malware system 140 performs packet-based scanning and inspection by passively capturing network packets bypassing the protocol stack or monitoring network drivers. The anti-malware system 140 may capture network packets at the network level of the Open Systems Interconnection (OSI) model of the networking framework. Additionally, the Anti-malware system 140 can be configured to work at multiple layers of the OSI model (e.g., data link layer, application layer), facilitating detection of anomalous network behavior at various layers in the OSI model.

The anti-malware system 140 may be configured to inspect scanned packet and use the particular fields and contents (e.g., headers, payload) to determine the traffic type corresponding to the packet. For example, the Anti-malware system 140 can identify that a scanned packet has a value of one (0x0001) in the QDCOUNT field, and consider that as an indication that the packet is DNS traffic, or inspect the packet for a HTTP version text in message headers, and/or other known fields of the HTTP protocol (e.g., HTTP-Version field). Subsequently, any HTTP traffic that is identified as including a request to connect to a hostname sent to the proxy server 120 is considered a proxy connection request by the anti-malware system 140. Furthermore, CONNECT HTTP proxy requests, as used in HTTPS, are identified as proxy connection requests by the anti-malware system 140. Anti-malware system 140 can also can be configured to monitor traffic flows associated with a communication session, for example, between a client 130 and the proxy server 120, to determine a traffic type for the packets associated with the session at the session level or application level.

Anti-malware system 140 may also monitor multiple ports of the proxy server 120 or clients 130*a-c*. The anti-malware system 140 may determine whether a scanned packet is related to a DNS communication (e.g., DNS request) or related to HTTP communication (e.g., proxy connection request). The Anti-malware system 140 can be configured to consider the particular port used for communicating a packet as an indication of the traffic type. As an example, the Anti-malware system 140 may identify a packet on port 53 as DNS traffic, or a packet on port 80 as HTTP traffic.

In some cases, anti-malware system 140 can also determine an original client from an HTTP request itself, for example the client IP address can be located in an HTTP header request, such as an X-Forwarded-For header, passed from the client 130a-c to proxy server 120. Additionally, the anti-malware system 140 can identify that a DNS error has occurred based on the presence of a DNS response code (RCODE) corresponding to NXDOMAIN (i.e., domain name does not exist) or YXDOMAIN (i.e., domain name exists when it should not).

The anti-malware system 140 can intercept HTTP and DNS traffic passively (i.e., out-of-band) or by being in-line with proxy connection requests and DNS requests/responses between the proxy server 120 and the respective endpoints. Additionally, the anti-malware system 140 can receive HTTP and DNS traffic by using a networking technique for routing traffic directed to proxy server 120 or the DNS Server 170 to the IP address for the anti-malware system 140. As an example, networking appliances (e.g., routers) are configured to automatically route DNS packets having a destination address associated with the DNS server 170 to be first received and scanned by the anti-malware system 140 to perform anti-malware monitoring functions prior transmission to the DNS server 170.

The anti-malware system 140 is configured to employ the HTTP and DNS traffic to perform client infection detection, to identify when a machine, for example client device 130, is responsible for initiating suspicious DNS queries and may be potentially infected with malware. Malware that may be resident on a client computer can communicate with a command-and-control system (C&C) that corresponds to a domain on the Internet, in order to receive instructions from and/or send information back to the malicious source of the attack. These communication sessions to the malware C&C can be short-lived, either by design (to avoid detection of the malware C&C by network administrators) or because identified attackers are quickly shutdown. In order to avoid detection, malware can be programmed to register hostnames under many domain names, including randomly created domain names (i.e., xyszkdk288383.info, 38dkd288333.biz), which may make detection using static rules difficult. Attackers may exploit existing DNS based technologies such as automatic domain name registrations, and domain generation algorithms (DGA) to automatically generate a large number of domain names to perform various attacks and to support botnet C&C. Additionally, for attackers, using dynamic DNS also allows them to deliver malicious payloads from constantly-changing hosting IP addresses, circumventing existing network security mechanisms such as DNS signatures and IP blacklisting.

As an example, malware on an infected client device 130 attempts to connect to a C&C operating at web server 180, housing malware or other malicious code. The client device 130 transmits a connection request, received by proxy server 120, as an attempt to resolve a domain name via DNS sever 170. If the IP address corresponding to the C&C is retrieved from the DNS server 170, the infected client device 130 has an open network session to the resolved IP address to establish communications with the C&C of the attacker. The proxy server 120 performs the DNS query on behalf of the client (i.e., client device does not perform DNS queries). This can make it difficult to identify an infected client using previous techniques, as the source of anomalous DNS requests appears to be the proxy server.

In operation, the anti-malware system 140 monitors proxy connection requests sent to proxy server 120. Additionally, the anti-malware system 140 monitors the corresponding responses, namely DNS requests and DNS responses, to and/or from the DNS server 170. The anti-malware system 140 is capable of associating client identities, from the proxy connection requests, to the DNS usage information, from the DNS requests and responses, to identify anomalous behavior of a client device 130. For instance, an erroneous DNS response received by the anti-malware system 140 is associated with the previously scanned proxy connection request initiating the DNS query. In other words, some DNS-based malware detection mechanisms cannot identify an infected client device 130, because the proxy server 120 is viewed as the originator of the DNS query triggering a detection rule, rather than the client device 130. However, the anti-malware system 140 is able to, based on linking the identity of the client device 130 (from the scanned proxy connection request) to a resulting DNS response, effectively identify the client device 130 that is the origin of a DNS query for a particular domain (e.g., network domain does not exist or could not be found) returning a DNS error.

The anti-malware system 140 uses data storage techniques and storage devices, shown as database 160, to create and maintain the associations, or links between client identities and DNS usage information. As an example, the anti-malware system 140 passively scans a proxy connection request, including a URL, as it is transmitted to the proxy server 120 from the client device 130 and stores the extracted information (i.e., client identity, hostname). For example, the anti-malware system 140 stores an identity of a client device 130 (e.g., IP address) extracted from the proxy connection request as a record in the rules 162 of database 160, in order to maintain the client identity while the requested hostname for the connection is being resolved. Based on the proxy connection request, a DNS query is generated by anti-malware system 140 and transmitted to the DNS server 170 to resolve the IP address for the hostname in the URL. Similarly, the DNS response, which is generated by the DNS server 170 in response to the query, is transmitted to, or otherwise scanned by, the anti-malware system 140. The anti-malware system 140 can then store information from the DNS request and DNS response in association with the client identity as DNS information 164.

When the anti-malware system 140 receives bad DNS responses for requested connections, the anti-malware system 140 can not only identify a potential malicious behavior on the network, but tie that behavior to a particular client 130a-c. The anti-malware system 140 may also compare the detected behavior to rules 162 including malware detection signatures indicative of particular types of malware. These signatures may specify particular conditions that indicate particular types of malware infections, such as a particular rate of erroneous DNS query responses, a particular DNS query rate, and the like, as further discussed below.

In some embodiments, database 160 includes rules 162. As an example, the rules 162 include malware detection rules that are applied by the anti-malware system 140 in analyzing DNS information for a client device 130 to determine whether the monitored DNS-related behavior of the client is considered anomalous, and/or associated with a malicious software program. The rules 162 can be either predetermined, or dynamically adjusted, based on criteria indicative of an infected machine, as identified by a network administrator, for example. Rules 162 can include, but is not limited to: a DNS request rate for a particular client; a DNS request failure rate for a particular client; hostnames with invalid IP addresses; and the like. In some cases, rules 162 include network hostnames, or domain names, that have been previously identified by the anti-malware system 140 as bad hostnames (e.g., generating a DNS error), hostnames known to be associated with malware (e.g., a blacklist); IP address associated with bad hostnames, or other information. The anti-malware system 140 may analyze the DNS information 164 based on the rules 162 to determine if any of the clients 130*a-c* are exhibiting behavior indicative of a malware infection.

Figure 2:
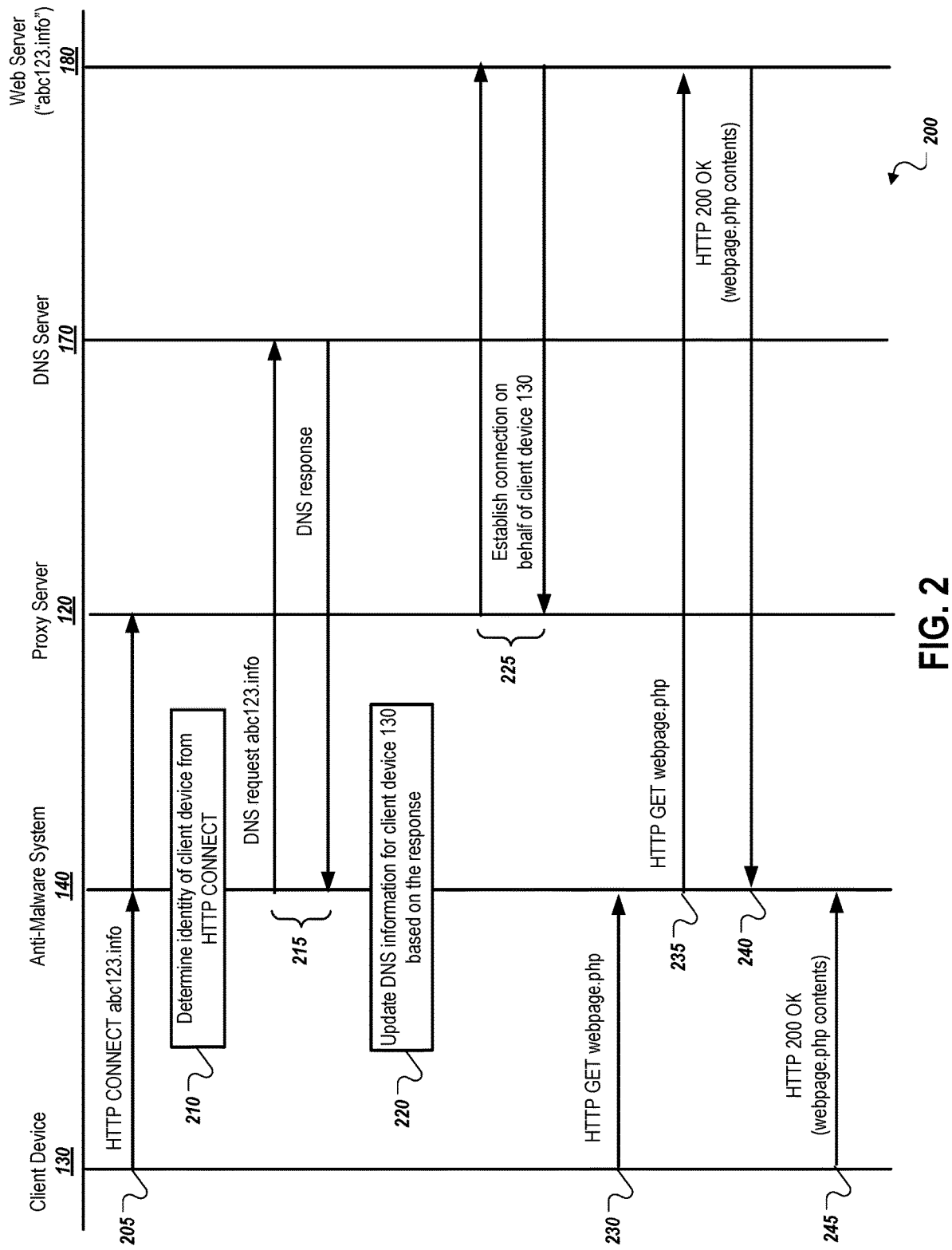
FIG. 2 is a message flow diagram of an example interaction between the components of the example network to implement network security based on DNS usage information.

FIG. 2 is a message flow diagram of an example interaction 200 between the components of the example network for implementing anti-malware security based on DNS usage information. At 205, client device 130 sends a proxy connection request to proxy server 120 in the form of an HTTP CONNECT message, as described relative to FIG. 1. The proxy connection request is also received by anti-malware system 140, which is monitoring the network for such messages as previously described. At 220, the anti-malware system 140 determines the identity of client device 130 based on the HTTP CONNECT message. For example, the anti-malware system 140 may identify the IP address from which the HTTP CONNECT message originated as the identity of the client device 130.

At 215, the anti-malware system 140 sends a DNS request to DNS server 170 to determine an address for the hostname in the HTTP CONNECT message ("abc123.info"), and receives a response. In some cases, the response includes one or more addresses corresponding to the hostname, and/or a status code indicating the result of the query, as previously described. In some cases, the anti-malware system 140 may monitor a DNS interaction between the proxy server 120 and the DNS server 170 (not shown), and update the stored DNS information (e.g., 164) for the client device 130 based on the monitored interaction, as described relative to FIG. 1.

At 225, the proxy server 120 establishes a connection with the web server 180 on behalf of client device 130. In some cases, the connection may be established subsequent to the proxy server 120 obtaining an address for the web server 180 from the DNS server 170 (not shown). At 230, the client device 130 sends an HTTP GET message requesting the resource "webpage.php" from webserver 180. At 235, the proxy server 120 forwards the request to the web server 180. At 240, the web server 180 responds with the requested resource, and at 245, the proxy server 120 forwards the requested resource to the client device 130.

As previously described, in some implementations the anti-malware system 140 passively monitors the proxy connection requests between the client device 130 and the proxy server 120. In some cases, the anti-malware system 140 may actively monitor these message, such as by being configured to be "in-band" with the transmissions so it receives them and forwards them to the ultimate destination. In some cases, the anti-malware system 140 may also monitor DNS traffic between the proxy server 120 and the DNS server 170. For example, as previously described, anti-malware system 140 may be configured as a DNS server of proxy server 120, and proxy server 120 may send its DNS queries to anti-malware system 140. Anti-malware system 140 may in turn query another DNS server (e.g., 170) to obtain the DNS response, and analyze and store information from the request and response before returning the response to the proxy server 120.

Figure 3:
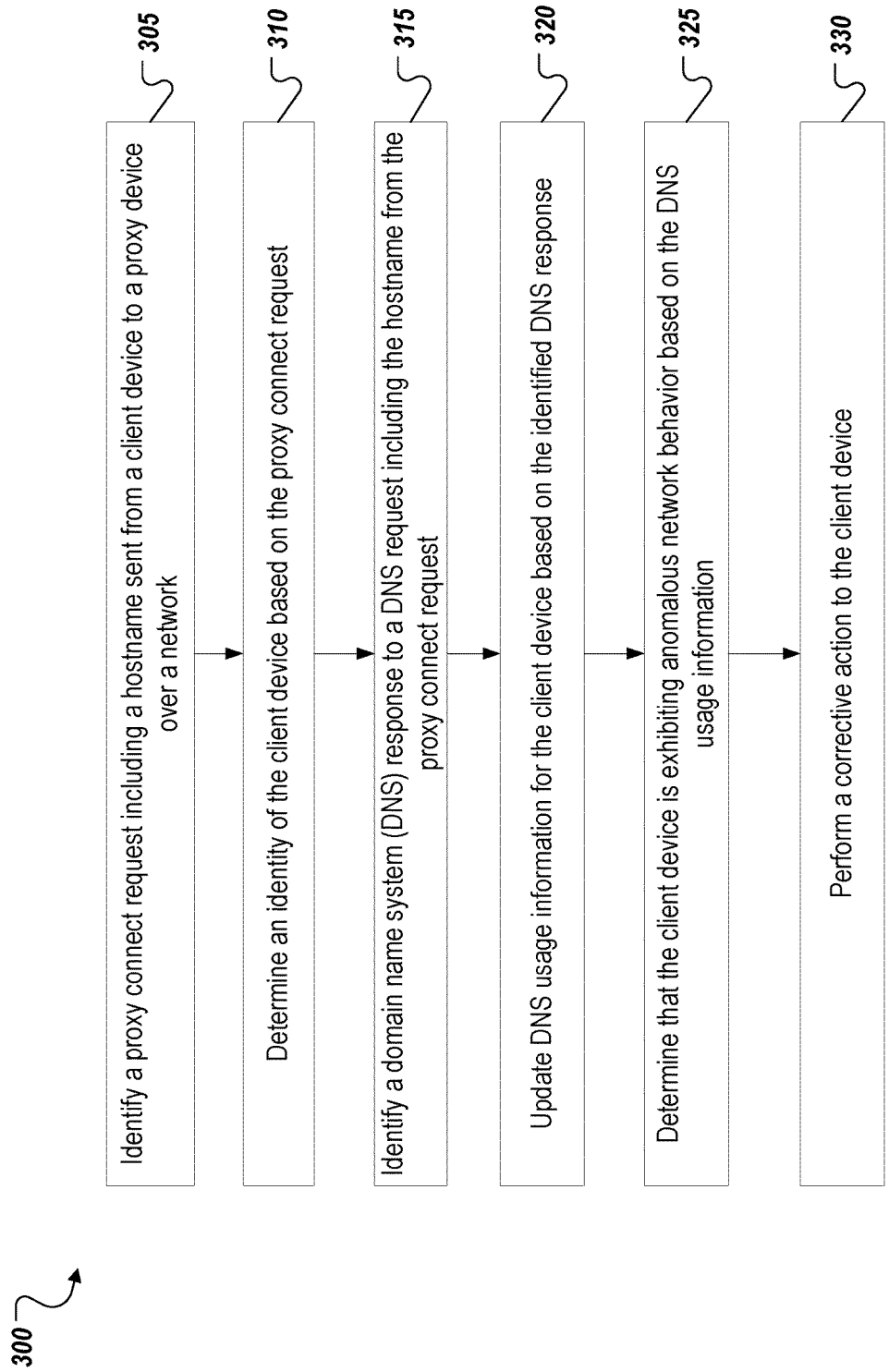
FIG. 3 is a flow chart of an example process for implementing network security based on DNS usage information.

FIG. 3 is a flow chart of an example process 300 for implementing anti-malware security based on DNS usage information. The process 300 may be implemented by the components described relative to FIG. 1, or by other configurations of components.

At 305, a proxy connection request is identified. The proxy connection request is sent from a client device to a proxy device over a network, and includes a hostname. In some cases, the proxy connection request is a HTTP message generated by a web browser or other program executing on the client device. In some cases, the hostname is included in a Uniform Resource Locator (URL).

At 310, an identity of the client device is determined based on the proxy connection request. In some cases, the anti-malware system inspects a proxy connect request to extract an identifier, for example an IP address, corresponding to the client device initiating the connect request to the proxy server. In some cases, the anti-malware system inspects a proxy connection request, to retrieve data which identifies the client, using traffic scanning techniques as described in reference to FIG. 1.

At 315, a DNS response is identified as a reply to a DNS request including the hostname from the proxy connection request. In some implementations, the DNS request is sent by the proxy server on behalf of the client device and in response to the proxy connection request. In some cases, the anti-malware system extracts a hostname from the proxy connection request, which is used to generate a DNS query to resolve a valid IP address for the requested hostname. For example, the anti-malware system can identify that a DNS response received from the DNS server indicates a successfully completed DNS query, including a resolved valid IP address corresponding to the hostname. Alternatively, the anti-malware system can determine that the DNS response indicates a DNS error, such as the hostname not existing. In some cases, a proxy server is used to conduct the DNS query for the hostname, rather than the anti-malware system. In this case, the anti-malware system is configured to passively scan the DNS traffic transmitted between the DNS server and the proxy server to identify a DNS response. In some cases, the anti-malware system records information related to the DNS query, such as the response and a resolved IP address, as a portion of DNS usage record.

At 320, DNS usage information for the client device is updated based on the identified DNS response. For example, the DNS usage information can be a data structure linking a particular client device with a DNS response received by the anti-malware system. Based on this correspondence, the anti-malware system can maintain and update a DNS usage record for the client reflecting monitored DNS related behavior of the client derived from scanning network traffic. In some cases, the anti-malware system can update the DNS usage information including, but not limited to, a DNS request rate for the particular device, a DNS failure rate for the particular device, and hostnames included in DNS requests associated with the particular client device.

At 325, a determination is made that the client device is exhibiting anomalous behavior based on the updated DNS usage information for the client. For instance, a client device transmitting a number of DNS queries that is over a predetermined DNS query threshold may be determined to be exhibiting anomalous behavior. A client device attempting to resolve an address for a hostname associated with malicious software (such as a botnet C&C) may be determined to be exhibiting anomalous behavior.

At 330, the anti-malware system performs a corrective action to the client device based on the determination. In some cases, the corrective action includes removing the particular device from the network. The corrective action may also include notifying an administrator of the anomalous behavior, such as by sending an email or other notification. The corrective action may also include isolating the client device from the rest of the network (i.e., quarantining the device) and observing its behavior to analyze the particular malware infection. The corrective action may also include installing a software upgrade on the client device, such as, for example, a security patch. The corrective action may also include executing a software program on the device, such as, for example, a software program configured to remove or disable a malicious program associated with the anomalous behavior exhibited by the client device. The corrective action may also include other actions or combinations of actions known in the art as responses to malware infections.

Figure 4:
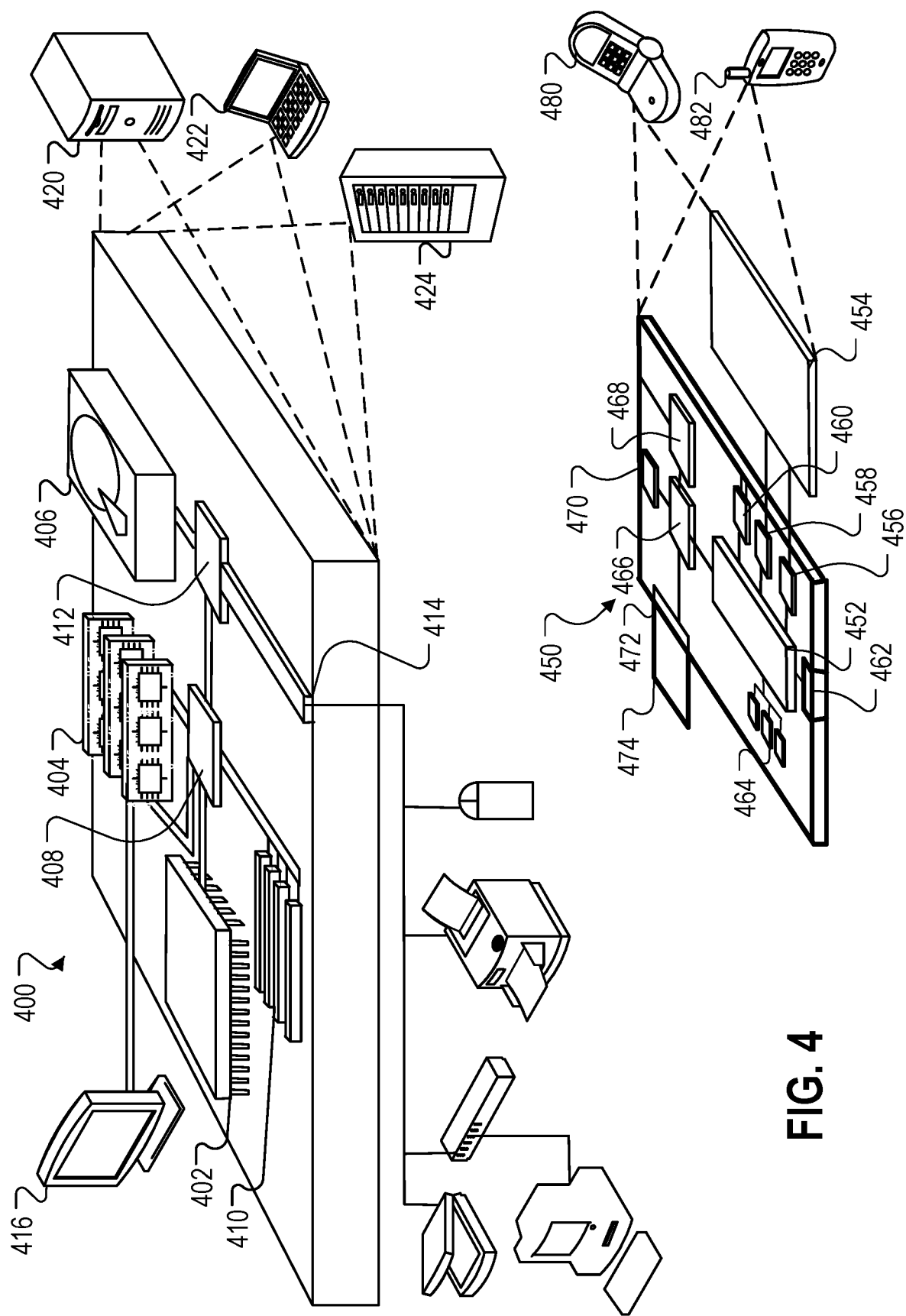
FIG. 4 is a diagram of computing devices that may be used to implement the systems and methods described herein.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally, computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various buses, and may be mounted on a common motherboard or in other manners, as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that includes separate and multiple analog and digital processors. Additionally, the processor may be implemented using any of a number of architectures. For example, the processor 452 may be a CISC (Complex Instruction Set Computers) processor, a RISC (Reduced Instruction Set Computer) processor, or an MISC (Minimal Instruction Set Computer) processor. The processor may provide, for example, coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry, where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user, as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front-end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method executed by one or more processors, the method comprising:
  passively monitoring, by an anti-malware system in data communication with a local area network (LAN), proxy connection requests sent from client devices on the LAN to a proxy, the proxy connection requests including a hostname and configured to direct the proxy to establish communication with a computer identified by the hostname on behalf of the client devices, wherein the anti-malware system is separate from the LAN;
  determining, by the anti-malware system, identities of the client devices based on the proxy connection requests;
  sending, by the anti-malware system and separately from the proxy establishing the directed communication, a domain name system (DNS) request to a DNS server to resolve an IP address for the hostname, wherein the DNS request includes the hostname from the proxy connection request, wherein the anti-malware system is configured to receive network traffic including interactions between the proxy, the client devices, and the DNS server to monitor anomalous network behavior;
  identifying, by the anti-malware system, a DNS response from a DNS server in response to the DNS request;
  determining, by the anti-malware system, that the DNS response is associated with a particular client device out of the plurality of client devices, based on the DNS response received by the anti-malware system;
  updating, by the anti-malware system, DNS usage information for the particular client device based on the identified DNS response including the hostname from the proxy connection request; and
  determining, by the anti-malware system, that the particular client is exhibiting anomalous behavior based on the updated DNS usage information.

2. The method of claim 1, wherein identifying the DNS response including the hostname includes:
  sending the DNS request including the hostname from the proxy connection request; and
  receiving the DNS response.

3. The method of claim 1, wherein the DNS usage information includes a DNS request rate for the particular client device, a DNS request failure rate for the particular client device, and hostnames included in DNS requests associated with the particular client device.

4. The method of claim 1, wherein the hostname is included in a Uniform Resource Locator (URL).

5. The method of claim 1, wherein the DNS request is sent by the proxy on behalf of the client devices and in response to the proxy connection request.

6. The method of claim 1, further comprising:
  performing a corrective action to the particular client device based on the determination.

7. The method of claim 6, wherein the anomalous behavior is associated with a malicious software program, and the corrective action includes removing the particular client device from the network.

8. A system comprising:
  one or more processors; and
  computer memory storing instructions that, when executed by the one or more processors, cause the one or more processors to perform operations comprising:
    executing an anti-malware system, comprising;
      identifying passively monitoring, by the anti-malware system in data communication with a local area network (LAN), proxy connection requests sent from client devices on the LAN to a proxy, the proxy connection requests including a hostname and configured to direct the proxy to establish communication with a computer identified by the hostname on behalf of the client devices, wherein the anti-malware system is separate from the LAN;
      determining, by the anti-malware system, identities of the client devices based on the proxy connection requests;
      sending, by the anti-malware system and separately from the proxy establishing the directed communication, a domain name system (DNS) request to a DNS server to resolve an IP address for the hostname, wherein the DNS request includes the hostname from the proxy connection request, wherein the anti-malware system is configured to receive network traffic including interactions between the proxy, the client devices, and the DNS server to monitor anomalous network behavior;
      identifying, by the anti-malware system, a DNS response from a DNS server in response to the DNS request;
      determining, by the anti-malware system, that the DNS response is associated with a particular client device out of the plurality of client devices, based on the DNS response received by the anti-malware system;
      updating, by the anti-malware system, DNS usage information for the particular client device based on the identified DNS response including the hostname from the proxy connection request; and
      determining, by the anti-malware system, that the particular client is exhibiting anomalous behavior based on the updated DNS usage information.

9. The system of claim 8, wherein identifying the DNS response including the hostname includes:
  sending the DNS request including the hostname from the proxy connection request; and
  receiving the DNS response.

10. The system of claim 8, wherein the DNS usage information includes a DNS request rate for the particular client device, a DNS request failure rate for the particular client device, and hostnames included in DNS requests associated with the particular client device.

11. The system of claim 8, wherein the hostname is included in a Uniform Resource Locator (URL).

12. The system of claim 8, wherein the DNS request is sent by the proxy on behalf of the client devices and in response to the proxy connection request.

13. The system of claim 8, wherein the operations further comprise:

performing a corrective action to the particular client device based on the determination.

14. The system of claim 13, wherein the anomalous behavior is associated with a malicious software program, and the corrective action includes removing the particular client device from the network.

15. A system comprising:
computing hardware operating together as an anti-malware system, the computing hardware comprising:
one or more network connections configured to communicate with a local area network (LAN);
one or more processors; and
computer-readable memory storing instructions that, when executed by the one or more processors, cause the one or more processors to operate the anti-malware system, comprising:
passively monitoring proxy connection requests sent from client devices on the LAN to a proxy, the proxy connection requests including a hostname and configured to direct the proxy to establish communication with a computer identified by the hostname on behalf of the client devices, wherein the anti-malware system is separate from the LAN;
determining identities of the client devices based on the proxy connection requests;
sending, separately from the proxy establishing the directed communication, a domain name system (DNS) request to a DNS server to resolve an IP address for the hostname, wherein the DNS request includes the hostname from the proxy connection request, wherein the anti-malware system is configured to receive network traffic including interactions between the proxy, the client devices, and the DNS server to monitor anomalous network behavior;
identifying, by the anti-malware system, a DNS response from a DNS server in response to the DNS request;
determining that the DNS response is associated with a particular client device out of the plurality of client devices, based on the DNS response received by the anti-malware system;
updating DNS usage information for the particular client device based on the identified DNS response including the hostname from the proxy connection request; and
determining that the particular client is exhibiting anomalous behavior based on the updated DNS usage information.

16. The system of claim 15, wherein identifying the DNS response including the hostname includes:
sending the DNS request including the hostname from the proxy connection request; and
receiving the DNS response.

17. The system of claim 15, wherein the DNS usage information includes a DNS request rate for the particular client device, a DNS request failure rate for the particular client device, and hostnames included in DNS requests associated with the particular client device.

18. The system of claim 15, wherein the hostname is included in a Uniform Resource Locator (URL).

19. The system of claim 15, wherein the DNS request is sent by the proxy on behalf of the client devices and in response to the proxy connection request.

20. The system of claim 15, wherein the anomalous behavior is associated with a malicious software program.

* * * * *

UNITED STATES PATENT AND TRADEMARK OFFICE
CERTIFICATE OF CORRECTION

| | |
|---|---|
| PATENT NO. | : 11,722,509 B2 |
| APPLICATION NO. | : 17/945892 |
| DATED | : August 8, 2023 |
| INVENTOR(S) | : Paul Michael Martini |

It is certified that error appears in the above-identified patent and that said Letters Patent is hereby corrected as shown below:

In the Claims

Column 16, Line 11, in Claim 8, before "passively" delete "identifying".

Signed and Sealed this
Nineteenth Day of September, 2023

*Katherine Kelly Vidal*

Katherine Kelly Vidal
*Director of the United States Patent and Trademark Office*